June 17, 1952 — M. REISS — 2,600,805
TELECENTRIC OBJECTIVE OF THE REVERSED TELEPHOTO TYPE
Filed Feb. 8, 1951

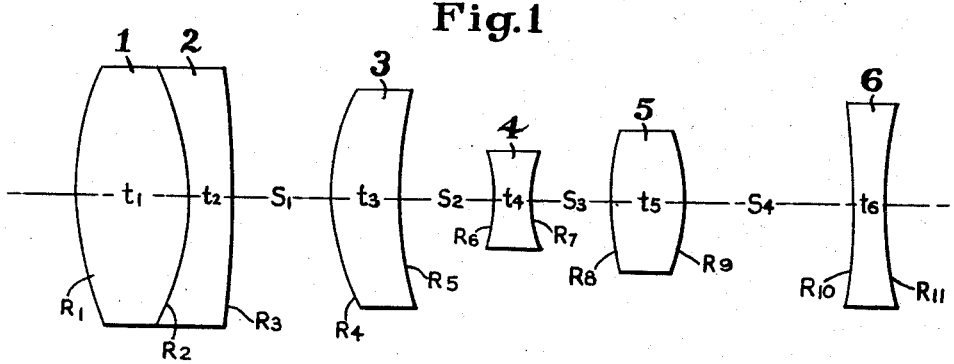

Fig. 2

EF = 100 mm.   MAGNIFICATION 10X

| LENS | N | V | RADII | THICKNESSES |
|---|---|---|---|---|
| 1 | 1.620 | 60.3 | $R_1 = +423.1$ mm. | $t_1 = 28.0$ mm. |
| 2 | 1.649 | 33.8 | $R_2 = -45.78$ | $t_2 = 7.5$ |
|   |       |      | $R_3 = -178.7$ | $S_1 = 26.3$ |
| 3 | 1.620 | 60.3 | $R_4 = +45.04$ | $t_3 = 16.8$ |
|   |       |      | $R_5 = +909.7$ | $S_2 = 25.6$ |
| 4 | 1.617 | 36.6 | $R_6 = -41.91$ | $t_4 = 6.3$ |
|   |       |      | $R_7 = +52.92$ | $S_3 = 22.4$ |
| 5 | 1.620 | 60.3 | $R_8 = +203.2$ | $t_5 = 14.7$ |
|   |       |      | $R_9 = -50.71$ | $S_4 = 39.3$ |
| 6 | 1.620 | 60.3 | $R_{10} = -475.0$ | $t_6 = 6.3$ |
|   |       |      | $R_{11} = +415.7$ |   |

Fig. 3

EF = 100 mm.   MAGNIFICATION 100X

| LENS | N | V | RADII | THICKNESSES |
|---|---|---|---|---|
| 1 | 1.620 | 60.3 | $R_1 = +188.3$ mm. | $t_1 = 40.3$ mm. |
| 2 | 1.649 | 33.8 | $R_2 = -43.56$ | $t_2 = 6.4$ |
|   |       |      | $R_3 = -192.7$ | $S_1 = 24.3$ |
| 3 | 1.620 | 60.3 | $R_4 = +44.20$ | $t_3 = 29.4$ |
|   |       |      | $R_5 = +928.5$ | $S_2 = 18.2$ |
| 4 | 1.617 | 36.6 | $R_6 = -38.91$ | $t_4 = 6.1$ |
|   |       |      | $R_7 = +50.62$ | $S_3 = 20.4$ |
| 5 | 1.620 | 60.3 | $R_8 = +178.4$ | $t_5 = 20.8$ |
|   |       |      | $R_9 = -51.02$ | $S_4 = 38.5$ |
| 6 | 1.605 | 43.6 | $R_{10} = -614.8$ | $t_6 = 6.1$ |
|   |       |      | $R_{11} = +322.8$ |   |

Max Reiss
Inventor

Daniel I. Mayer
Harold F. Bennett
atty. & agt.

Patented June 17, 1952

2,600,805

UNITED STATES PATENT OFFICE 2,600,805

TELECENTRIC OBJECTIVE OF THE REVERSED TELEPHOTO TYPE

Max Reiss, Rochester, N. Y., assignor to Eastman Kodak Company, Rochester, N. Y., a corporation of New Jersey Application February 8, 1951, Serial No. 209,985

3 Claims. (Cl. 88—57)

This invention relates to telecentric objectives such as used in optical comparators and profile projectors.

Telecentric lenses were discovered by I. Porro in 1848 and independently by E. Abbe in 1878. The characteristic feature of these systems is that the position of the diaphragm is such that the principal rays on the short conjugate side of the lens are parallel to the axis. The effect of this arrangement is that the object to be projected may be moved in and out of focus without changing its apparent size on the projection screen. Alternatively the object may have considerable thickness, and part of it may be closer to the lens than the true conjugate plane and part of it farther away. These parts will then be projected at the same magnification regardless of the difference in their distance from the lens. Lenses of this kind are widely used by tool makers for testing gear wheels and similar objects at various stages of their manufacture.

Telecentric objectives of the reversed telephoto type are characterized by having a negative component facing the long conjugate (i. e., the projection screen) for increasing the clearance between the short conjugate plane and the objective.

The present invention is a specific improvement over the two telecentric objectives shown as the last two examples in a copending application, Ser. No. 64,404, Turner and Kingslake, filed December 9, 1948, now Patent 2,552,238, dated May 8, 1951. The objectives disclosed herein are specifically designed for use as interchangeable units in the system disclosed in the Turner and Kingslake application, and are also useful as interchangeable telecentric objectives in ordinary profile projectors.

According to the present invention, a telecentric objective of the reversed telephoto type is made up of a field lens and an objective system spaced apart so that the principal focal point of the field lens is located within the body of the objective system, wherein the field lens consists of a biconvex element cemented to the front of a negative meniscus element and the objective system consists of a positive meniscus element, a front biconcave element, a biconvex element, and a rear biconcave element spaced apart and in that order, the positive meniscus element being concave toward the rear, i. e., toward the first biconcave element.

I have discovered that by making the front element of the objective system meniscus rather than by convex as in the Turner and Kingslake examples and by keeping the radii of curvature of the several surfaces within certain definite limits defined below, I have been able to make up a series of telecentric objectives for use at a series of magnifications from 10 to 100 which are highly corrected for distortion, coma, curvature of field and spherical aberration and using only inexpensive types of glass readily obtainable on the market.

In some conditions of use, i. e., when means are provided for focusing by changing the distance between the object and the projection screen, a single objective according to the invention is used throughout this range of magnification, and produces very clear and sharp images, but the distortion will be found to change slightly at different magnifications—not enough to be noticeable, but enough to reduce the accuracy of careful measurements.

For the purposes of the Turner and Kingslake invention, the distance between conjugate planes is fixed, and an extremely high degree of correction of the distortion is important so that measurements made on the projected image are accurately applicable to the original object. Furthermore, a fixed series of magnifications such as 10, 20, 31.25, 50, 62.5 and 100 is generally preferable to a continuously variable magnification in machine shop practice since measurements of the projected image are usually made by the ordinary scales divided into decimal parts of an inch or into 16ths and 32nds and more often than not relate to thousandths of an inch in the original object. In some shops a magnification of 39.37 for projecting a thousandth of an inch as a millimeter is very useful.

I have found that a very high degree of correction of the aberration and particularly of distortion is obtained by making all six lens elements of readily obtainable glasses having refractive indices between 1.59 and 1.67, and by making the respective radii of curvature $R_1$ to $R_{11}$ of the respective surfaces numbering from front to rear, within the following limits:

$$1.5 F < +R_1 < 3.0 F$$
$$0.42 F < -R_2 < 0.48 F$$
$$1.7 F < -R_3 < 2.5 F$$
$$0.42 F < +R_4 < 0.48 F$$
$$5.5 F < +R_5 < 50 F$$
$$0.36 F < -R_6 < 0.44 F$$
$$0.47 F < +R_7 < 0.57 F$$
$$1.6 F < +R_8 < 2.3 F$$
$$0.47 F < -R_9 < 0.57 F$$
$$2.8 F < -R_{10} < 9 F$$
$$2.7 F < +R_{11} < 6 F$$

where F is the focal length of the objective as a whole and the + and − values of the radii indicate surfaces respectively convex and concave to the front.

It may be noted that some of these radii appear to be specified within a very broad range of values as compared with other radii. When it is remembered, however, that the effect a surface has on the focal length and on the aberrations of the whole objective is much more nearly proportional to its curvature, i. e., the reciprocal of its radius of curvature, than to its radius of curvature, it will be seen that the limits are roughly of the same order of magnitude in all cases (in terms of the curvatures).

Within these broad ranges I find some particular relationships among the constants of the lens system to be particularly advantageous. With respect to the field lens, I find that the refractive index $N_2$ of the negative meniscus element should be between $(N_1+0.02)$ and $(N_1+0.04)$ where $N_1$ is the refractive index of the biconvex element cemented thereto. I find that an index difference of about 0.03 at this cemented surface flattens the field very effectively and without introducing an undue amount of zonal distortion as is likely to occur if this index difference is chosen as greater than 0.04. Also, I find it convenient to choose curvatures such that the sum of the powers of the two glass-air surfaces of the field lens is between 0.55 and 0.75.

I find also that the radii of curvature which give good results at one magnification differ but little from those which give good results at another magnification when expressed in terms of unit focal length. Slight adjustments are necessary, however, to accommodate for different lens thicknesses and for slight changes in refractive indices. These slight adjustments are made in a manner well known among lens designers.

The thicknesses of the lens elements are chosen on the basis of practical considerations. There is a minimum thickness below which it is not practical to work. In the case of negative elements this minimum is set by the tendency of the glass to bend during grinding and polishing and is about 0.4 mm. for lenses of 5 mm. diameter and about 1 mm. for lenses of 10 mm. diameter. In the case of positive lenses, this minimum is set by the difficulty of polishing a lens element to a knife-edge and the difficulty of edge-grinding a thin-edged element without chipping. The edge thickness should be at least a millimeter for easy manufacture. Furthermore, any objective must be made up in a shorter focal length for use at a higher magnification when, as in the Turner and Kingslake system, the distance between the conjugate planes is fixed, and telecentric objectives are no exception to this rule. It may be noted that specifications are customarily given in terms of a focal length of 100 mm. to facilitate comparison, but the dimensions are proportionately scaled up or down to get the focal length needed in the particular conditions of use. Thus it is found at times that an objective suitable for use at one focal length has elements that are too thin for practical manufacture when scaled down to a shorter focal length.

In the case of objectives according to the present invention, I have found that a satisfactory thickness can be chosen for each of the three negative elements which remains at substantially the same fraction of the focal length in all the different examples designed for different focal lengths. This is practicable because the higher magnification objectives cover smaller fields, hence the diameters of the elements are smaller, hence the minimum practical thickness (in millimeters) is smaller. The advantage of maintaining these thicknesses at substantially the same fraction of the focal length lies in the fact that less final readjustment of radii of curvature is required when adapting a design for use at a different magnification. Notwithstanding the above, I find that a judicious change in the thickness of the negative meniscus element is advantageous in balancing the effect on the aberrations of a change in the thickness of the biconvex element cemented thereto.

In regard to the thicknesses of the three positive elements, I have found that suitably chosen thicknesses for objectives designed for use in the lower and middle parts of the above-described range of magnifications lead to undesirably thin elements when scaled down to a shorter focal length for the highest magnification, and so it is advantageous to make the positive elements relatively thicker in the latter case. To partially compensate (aberration-wise) for the increased thickness of the cemented positive element, I find that a slight decrease in the thickness of the cemented negative element and a slight decrease in the first airspace are advantageous. Also I find that an increase in the thickness of the meniscus positive element is roughly compensated by a decrease of about six-tenths as much in the second airspace, and that an increase in thickness of the rear positive element is roughly compensated by a decrease of about one-third as much in the third airspace plus a decrease of about one-sixth as much in the fourth airspace.

In view of the practical considerations previously described and in view of these interrelationships among the thicknesses and spaces, I have found it desirable to maintain each thickness $t$ and each space $s$ (each numbered by subscripts from front to rear) within the limits specified as follows:

$$0.25\ F < t_1 < 0.43\ F$$
$$0.05\ F < t_2 < 0.10\ F$$
$$0.14\ F < t_3 < 0.44\ F$$
$$0.05\ F < t_4 < 0.10\ F$$
$$0.10\ F < t_5 < 0.25\ F$$
$$0.05\ F < t_6 < 0.10\ F$$
$$0.20\ F < s_1 < 0.30\ F$$
$$(0.32\ F - 0.6 t_3) < s_2 < (0.40\ F - 0.6 t_3)$$
$$(0.24\ F - \tfrac{1}{3} t_5) < s_3 < (0.30\ F - \tfrac{1}{3} t_5)$$
$$(0.37\ F - \tfrac{1}{6} t_5) < s_4 < (0.47\ F - \tfrac{1}{6} t_5)$$

In regard to color correction, I have found that the dispersive index of the positive elements should be between 1.6 and 1.8 times the average dispersive index of the first two negative elements (numbering from front to rear) for good correction of the axial color. The lateral color tends to change with magnification, however, and I have found that the lateral color correction can be maintained by choosing a glass of different dispersive index for the rear negative element. Although only a rough rule can be given for this dispersive index, I find that the optimum value varies more nearly as the square root of the magnification than as the magnification itself, and that the dispersive index $V_6$ of this element should be between $(65 - 2.5\sqrt{M})$ and $(72 - 2.5\sqrt{M})$ for best results. Thus, when the magnification at which the objective is intended to work is 10, $V_6$ should be roughly between 57 and 64; when the magnification is 50, $V_6$ should be between 47 and 54; and when the magnification is 100, $V_6$ should be between 40 and 47. Although it is not feasible to have a special glass made up in each case to obtain a dispersive index exactly in the middle of this specified range, a series of glasses is commercially available having refractive indices between 1.60 and 1.62 and dispersive indices increasing from glass to glass in steps of less than 6 points throughout the range from 36.6 to 60.3. There is at least one glass of this series which falls between the specified limits for any magnification from 10 to 100.

The change to a different glass to obtain a favorable dispersive index involves a moderate change in refractive index in most cases. As the final step in the design of an objective according to the invention, the radii of curvature are adjusted slightly, as is commonly done in lens designing, to reduce the residual aberrations to within acceptable tolerances.

In the accompanying drawing:

Fig. 1 shows in diagrammatic axial section an objective according to the invention.

Figs. 2 and 3 give data for two embodiments thereof.

As shown in Fig. 1 the field lens is made up of two elements 1, 2 cemented together, and the objective system is made up of a positive meniscus element 3, a front biconcave element 4, a biconvex element 5, and a rear biconcave element 6. The radii of curvature R of the respective lens surfaces, the thicknesses $t$ of the lens elements, and the airspaces $s$ between components are each numbered by subscripts from front to rear.

Figs. 2 and 3 give data for telecentric objectives designed for use at 10× and at 100× magnification respectively. These tables are repeated below as the first and last of seven examples of telecentric objectives according to the invention. In Figs. 2 and 3 and in the tables below, the lens elements are designated by number in the first column, the corresponding refractive index N for the D line of the spectrum and the dispersive index V are given in the second and third columns, and the radii, thicknesses, and spaces are given in the last two columns. The + and − values of radii R denote surfaces respectively convex and concave toward the front. The linear dimensions have been scaled up in each case to correspond to the customary focal length of 100 mm. to facilitate comparisons.

[Example 1, Fig. 2.  Magnification=10]

| Lens | N | V | Radii | Thicknesses |
|---|---|---|---|---|
| | | | Mm. | Mm. |
| 1 | 1.620 | 60.3 | $R_1 = +243.1$ | $t_1 = 28.0$ |
| 2 | 1.649 | 33.8 | $R_2 = -45.78$ | $t_2 = 7.5$ |
| | | | $R_3 = -178.7$ | $s_1 = 26.3$ |
| 3 | 1.620 | 60.3 | $R_4 = +45.04$ | $t_3 = 16.8$ |
| | | | $R_5 = +909.7$ | $s_2 = 25.6$ |
| 4 | 1.617 | 36.6 | $R_6 = -41.91$ | $t_4 = 6.3$ |
| | | | $R_7 = +52.92$ | $s_3 = 22.4$ |
| 5 | 1.620 | 60.3 | $R_8 = +203.2$ | $t_5 = 14.7$ |
| | | | $R_9 = -50.71$ | $s_4 = 39.3$ |
| 6 | 1.620 | 60.3 | $R_{10} = -475.0$ | $t_6 = 6.3$ |
| | | | $R_{11} = -415.7$ | |

[Example 2.  Magnification=20]

| Lens | N | V | Radii | Thicknesses |
|---|---|---|---|---|
| | | | Mm. | Mm. |
| 1 | 1.620 | 60.3 | $R_1 = +170.1$ | $t_1 = 28.4$ |
| 2 | 1.649 | 33.8 | $R_2 = -45.70$ | $t_2 = 7.6$ |
| | | | $R_3 = -216.5$ | $s_1 = 24.5$ |
| 3 | 1.620 | 60.3 | $R_4 = +45.93$ | $t_3 = 17.0$ |
| | | | $R_5 = +1247.$ | $s_2 = 26.1$ |
| 4 | 1.617 | 36.6 | $R_6 = -39.70$ | $t_4 = 6.4$ |
| | | | $R_7 = +52.57$ | $s_3 = 22.7$ |
| 5 | 1.620 | 60.3 | $R_8 = +206.6$ | $t_5 = 14.7$ |
| | | | $R_9 = -51.28$ | $s_4 = 39.7$ |
| 6 | 1.617 | 55.0 | $R_{10} = -332.9$ | $t_6 = 6.4$ |
| | | | $R_{11} = +677.1$ | |

[Example 3  Magnification  31.25]

| Lens | N | V | Radii | Thicknesses |
|---|---|---|---|---|
| | | | Mm. | Mm. |
| 1 | 1.620 | 60.3 | $R_1 = +159.6$ | $t_1 = 28.2$ |
| 2 | 1.649 | 33.8 | $R_2 = -46.26$ | $t_2 = 7.5$ |
| | | | $R_3 = -233.1$ | $s_1 = 24.9$ |
| 3 | 1.620 | 60.3 | $R_4 = +44.78$ | $t_3 = 17.0$ |
| | | | $R_5 = +719.0$ | $s_2 = 25.4$ |
| 4 | 1.617 | 36.6 | $R_6 = -40.26$ | $t_4 = 6.4$ |
| | | | $R_7 = +51.09$ | $s_3 = 22.5$ |
| 5 | 1.620 | 60.3 | $R_8 = +204.6$ | $t_5 = 14.8$ |
| | | | $R_9 = -51.09$ | $s_4 = 39.6$ |
| 6 | 1.617 | 55.0 | $R_{10} = -543.3$ | $t_6 = 6.4$ |
| | | | $R_{11} = +375.6$ | |

[Example 4  Magnification=39.37]

| Lens | N | V | Radii | Thicknesses |
|---|---|---|---|---|
| | | | Mm. | Mm. |
| 1 | 1.620 | 60.3 | $R_1 = +159.6$ | $t_1 = 28.2$ |
| 2 | 1.649 | 33.8 | $R_2 = -46.16$ | $t_2 = 7.5$ |
| | | | $R_3 = -232.6$ | $s_1 = 24.9$ |
| 3 | 1.620 | 60.3 | $R_4 = +44.81$ | $t_3 = 16.9$ |
| | | | $R_5 = +717.2$ | $s_2 = 25.4$ |
| 4 | 1.617 | 36.6 | $R_6 = -40.37$ | $t_4 = 6.4$ |
| | | | $R_7 = +51.08$ | $s_3 = 22.5$ |
| 5 | 1.620 | 60.3 | $R_8 = +204.6$ | $t_5 = 14.8$ |
| | | | $R_9 = -51.08$ | $s_4 = 39.6$ |
| 6 | 1.617 | 55.0 | $R_{10} = -543.7$ | $t_6 = 6.4$ |
| | | | $R_{11} = +375.7$ | |

[Example 5  Magnification  50.]

| Lens | N | V | Radii | Thicknesses |
|---|---|---|---|---|
| | | | Mm. | Mm. |
| 1 | 1.620 | 60.3 | $R_1 = +159.9$ | $t_1 = 28.3$ |
| 2 | 1.649 | 33.8 | $R_2 = -46.36$ | $t_2 = 7.6$ |
| | | | $R_3 = -232.8$ | $s_1 = 25.0$ |
| 3 | 1.620 | 60.3 | $R_4 = +45.47$ | $t_3 = 16.9$ |
| | | | $R_5 = +955.4$ | $s_2 = 25.5$ |
| 4 | 1.617 | 36.6 | $R_6 = -40.03$ | $t_4 = 6.4$ |
| | | | $R_7 = +51.94$ | $s_3 = 22.5$ |
| 5 | 1.620 | 60.3 | $R_8 = +187.8$ | $t_5 = 14.8$ |
| | | | $R_9 = -52.21$ | $s_4 = 39.6$ |
| 6 | 1.616 | 49.2 | $R_{10} = -589.9$ | $t_6 = 6.4$ |
| | | | $R_{11} = +355.2$ | |

[Example 6  Magnification=62.5]

| Lens | N | V | Radii | Thicknesses |
|---|---|---|---|---|
| | | | Mm. | Mm. |
| 1 | 1.620 | 60.3 | $R_1 = +157.9$ | $t_1 = 27.9$ |
| 2 | 1.649 | 33.8 | $R_2 = -46.0$ | $t_2 = 7.4$ |
| | | | $R_3 = -231.6$ | $s_1 = 26.3$ |
| 3 | 1.620 | 60.3 | $R_4 = +46.01$ | $t_3 = 19.3$ |
| | | | $R_5 = +1900.$ | $s_2 = 24.0$ |
| 4 | 1.617 | 36.6 | $R_6 = -39.26$ | $t_4 = 6.3$ |
| | | | $R_7 = +52.25$ | $s_3 = 22.4$ |
| 5 | 1.620 | 60.3 | $R_8 = +199.0$ | $t_5 = 14.6$ |
| | | | $R_9 = -50.90$ | $s_4 = 39.3$ |
| 6 | 1.616 | 49.2 | $R_{10} = -539.4$ | $t_6 = 6.3$ |
| | | | $R_{11} = +374.1$ | |

[Example 7, Fig. 3  Magnification=100.]

| Lens | N | V | Radii | Thicknesses |
|---|---|---|---|---|
| | | | Mm. | Mm. |
| 1 | 1.620 | 60.3 | $R_1 = +188.3$ | $t_1 = 40.3$ |
| 2 | 1.649 | 33.8 | $R_2 = -43.56$ | $t_2 = 6.4$ |
| | | | $R_3 = -192.7$ | $s_1 = 24.3$ |
| 3 | 1.620 | 60.3 | $R_4 = +44.20$ | $t_3 = 29.4$ |
| | | | $R_5 = +928.5$ | $s_2 = 18.2$ |
| 4 | 1.617 | 36.6 | $R_6 = -38.91$ | $t_4 = 6.1$ |
| | | | $R_7 = +50.62$ | $s_3 = 20.4$ |
| 5 | 1.620 | 60.3 | $R_8 = +178.4$ | $t_5 = 20.8$ |
| | | | $R_9 = -51.02$ | $s_4 = 38.5$ |
| 6 | 1.605 | 43.6 | $R_{10} = -614.8$ | $t_6 = 6.1$ |
| | | | $R_{11} = +322.8$ | |

These seven examples were designed to be used as interchangeable objectives between conjugate planes which are optically 768 mm. apart and to be combined with a Fresnel-type field lens near the long-conjugate plane as described in the above-mentioned Turner and Kingslake application. By "conjugate planes which are optically 768 mm. apart" is meant that the distance from the short conjugate plane to the apparent position of the long-conjugate plane as viewed from the rear surface of the telecentric objective is 768 mm. The actual distance is slightly different, due to the effect of the Fresnel-type lens. The distortion of these systems is corrected to a residual value which counterbalances the distortion due to the Fresnel-type lens.

Although, as previously mentioned, the focal lengths are given here as 100 mm. in each case, the focal lengths when made up for use as interchangeable lenses in the manner described are as follows:

| Example No. | Magnification | Focal Length |
|---|---|---|
| | | Mm. |
| 1 | 10 | 63.76 |
| 2 | 20 | 34.79 |
| 3 | 31.25 | 23.00 |
| 4 | 39.37 | 18.48 |
| 5 | 50. | 14.69 |
| 6 | 62.5 | 11.846 |
| 7 | 100. | 7.487 |

The linear dimensions given above are to be multiplied by a constant in each case in a manner too well known to need description, and by proportionately smaller or larger constants when made up for use between conjugate planes that are closer together or farther apart than the distance above mentioned.

It will be directly evident from inspection of these tables that each radius of curvature R, each thickness $t$, and each space $s$ in all the examples is within the specified range according to the invention. The value of $(2.5\sqrt{M}+V_7)$ is approximately as follows in the seven examples:

| Example | $(2.5)\sqrt{M}+V_7$ |
|---|---|
| 1 | 68.2 |
| 2 | 66.2 |
| 3 | 69.0 |
| 4 | 70.7 |
| 5 | 66.9 |
| 6 | 69.0 |
| 7 | 68.6 |

These values are between 65 and 72 in all examples in accordance with this feature of the invention and each objective is well corrected for color when used with a Fresnel-type field lens at the long conjugate plane as described in the previously mentioned copending application.

I claim:

1. A telecentric objective of the reversed telephoto type adapted to be used at a magnification between 10 and 100 inclusive and corrected for spherical aberration, coma, distortion, curvature of field, and lateral color at said magnification, comprising a field lens in front, that is facing the shorter conjugate, and an objective system axially aligned and spaced therebehind, in which the field lens consists of a biconvex element cemented to the front of a meniscus negative element whose refractive index is greater than that of the biconvex element by between 0.02 and 0.04, and in which the objective system consists of a positive meniscus element convex to the front, a front biconcave element, a biconvex element and a rear biconcave element airspaced apart in that order from front to rear, in which the radii of curvature R of the lens surfaces, the thicknesses $t$ of the lens elements, and the airspaces $s$, each numbered by subscripts from front to rear, are numerically within the limits set forth in the following table of inequalities:

$$1.5\,F < R_1 < 3.0\,F$$
$$0.42\,F < R_2 < 0.48\,F$$
$$1.7\,F < R_3 < 2.5\,F$$
$$0.42\,F < R_4 < 0.48\,F$$
$$5.5\,F < R_5 < 50\,F$$
$$0.36\,F < R_6 < 0.44\,F$$
$$0.47\,F < R_7 < 0.57\,F$$
$$1.6\,F < R_8 < 2.3\,F$$
$$0.47\,F < R_9 < 0.57\,F$$
$$2.8\,F < R_{10} < 9\,F$$
$$2.7\,F < R_{11} < 6\,F$$
$$0.25\,F < t_1 < 0.43\,F$$
$$0.05\,F < t_2 < 0.10\,F$$
$$0.14\,F < t_3 < 0.44\,F$$
$$0.05\,F < t_4 < 0.10\,F$$
$$0.10\,F < t_5 < 0.25\,F$$
$$0.05\,F < t_6 < 0.10\,F$$
$$0.20\,F < s_1 < 0.30\,F$$
$$0.06\,F < s_2 < 0.32\,F$$
$$0.16\,F < s_3 < 0.27\,F$$
$$0.33\,F < s_4 < 0.45\,F$$

where F is the focal length of the telecentric objective, and in which the refractive index of each element is between 1.59 and 1.67.

2. A telecentric objective according to claim 1 constructed substantially according to the following specifications:

| Lens | N | V | Radii | Thicknesses |
|---|---|---|---|---|
| 1 | 1.62 | 60.3 | $R_1 = +2.4F$ | $t_1 = .28F$ |
| 2 | 1.65 | 33.8 | $R_2 = -.46F$ | $t_2 = .08F$ |
|   |      |      | $R_3 = -1.8F$ | $s_1 = .26F$ |
| 3 | 1.62 | 60.3 | $R_4 = +.45F$ | $t_3 = .17F$ |
|   |      |      | $R_5 = +9.1F$ | $s_2 = .26F$ |
| 4 | 1.62 | 36.6 | $R_6 = -.42F$ | $t_4 = .06F$ |
|   |      |      | $R_7 = +.53F$ | $s_3 = .22F$ |
| 5 | 1.62 | 60.3 | $R_8 = +2.0F$ | $t_5 = .15F$ |
|   |      |      | $R_9 = -.51F$ | $s_4 = .39F$ |
| 6 | 1.62 | 60.3 | $R_{10} = -4.8F$ | $t_6 = .06F$ |
|   |      |      | $R_{11} = -4.2F$ | | where the lens elements are numbered from front to rear, N is the refractive index for the D line of the spectrum, V is the conventional dispersive index, and the + and − values of radii R denote surfaces respectively convex and concave to the front.

3. A telecentric objective according to claim 1 constructed substantially according to the following specifications:

| Lens | N | V | Radii | Thicknesses |
|---|---|---|---|---|
| 1 | 1.620 | 60.3 | $R_1 = +1.9F$ | $t_1 = .40F$ |
| 2 | 1.649 | 33.8 | $R_2 = -.44F$ | $t_2 = .06F$ |
|   |       |      | $R_3 = -1.9F$ | $s_1 = .24F$ |
| 3 | 1.620 | 60.3 | $R_4 = +.44F$ | $t_3 = .29F$ |
|   |       |      | $R_5 = +9.3F$ | $s_2 = .18F$ |
| 4 | 1.617 | 36.6 | $R_6 = -.39F$ | $t_4 = .06F$ |
|   |       |      | $R_7 = +.51F$ | $s_3 = .20F$ |
| 5 | 1.620 | 60.3 | $R_8 = +1.8F$ | $t_5 = .21F$ |
|   |       |      | $R_9 = -.51F$ | $s_4 = .38F$ |
| 6 | 1.605 | 43.6 | $R_{10} = -6.1F$ | $t_6 = .06F$ |
|   |       |      | $R_{11} = +3.2F$ | | where the lens elements are numbered from front to rear, N is the refractive index for the D line of the spectrum, V is the conventional dispersive index, and the + and − values of radii R denote surfaces respectively convex and concave to the front.

MAX REISS.

(References on following page)

REFERENCES CITED

The following references are of record in the file of this patent:

UNITED STATES PATENTS

| Number | Name | Date |
|---|---|---|
| 2,256,228 | Zimmermann | Sept. 16, 1941 |
| 2,313,460 | Warmisham | Mar. 9, 1943 |
| 2,380,210 | Bennett | July 10, 1945 |
| 2,391,210 | Warmisham et al. | Dec. 18, 1945 |
| 2,394,959 | Wynne | Feb. 12, 1946 |

FOREIGN PATENTS

| Number | Country | Date |
|---|---|---|
| 444,350 | Great Britain | Mar. 19, 1936 |